United States Patent
Zeyliger

(10) Patent No.: US 9,747,333 B2
(45) Date of Patent: Aug. 29, 2017

(54) QUERYING OPERATING SYSTEM STATE ON MULTIPLE MACHINES DECLARATIVELY

(71) Applicant: Cloudera, Inc., Palo Alto, CA (US)

(72) Inventor: Philip Zeyliger, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 343 days.

(21) Appl. No.: 14/510,006

(22) Filed: Oct. 8, 2014

(65) Prior Publication Data

US 2016/0103874 A1    Apr. 14, 2016

(51) Int. Cl.
*G06F 17/30* (2006.01)
*G06F 3/0484* (2013.01)
*G06F 3/0482* (2013.01)

(52) U.S. Cl.
CPC .. *G06F 17/30424* (2013.01); *G06F 17/30445* (2013.01); *G06F 17/30545* (2013.01); *G06F 3/0482* (2013.01); *G06F 3/04842* (2013.01); *G06F 17/3056* (2013.01); *G06F 17/30339* (2013.01); *G06F 17/30442* (2013.01); *G06F 17/30477* (2013.01); *G06F 17/30539* (2013.01); *G06F 17/30554* (2013.01); *G06F 17/30864* (2013.01)

(58) Field of Classification Search
CPC ......... G06F 17/30563; G06F 17/30598; G06F 17/30705; G06F 17/30545; G06F 17/30575; G06F 17/30445; G06F 17/30557; G06F 17/30566; G06F 17/30572

USPC ....... 707/722, 737, 758, 769, 602, 607, 770, 707/713

See application file for complete search history.

(56) References Cited

U.S. PATENT DOCUMENTS

| | | | |
|---|---|---|---|
| 5,325,522 A | 6/1994 | Vaughn | |
| 5,825,877 A | 10/1998 | Dan et al. | |
| 6,542,930 B1 | 4/2003 | Auvenshine | |
| 6,553,476 B1 | 4/2003 | Ayaki et al. | |
| 6,598,058 B2 * | 7/2003 | Bird ................. | G06F 17/30595 |
| | | | 707/999.001 |
| 6,651,242 B1 | 11/2003 | Hebbagodi et al. | |
| 6,678,828 B1 | 1/2004 | Pham et al. | |
| 6,687,847 B1 | 2/2004 | Aguilera et al. | |
| 6,931,530 B2 | 8/2005 | Pham et al. | |

(Continued)

OTHER PUBLICATIONS

Babaoglu, O., and K. Marzullo, "Consistent global states of distributed systems: Fundamental concepts and mechanisms," Distributed Systems, 53 pages, Jan. 1993.

(Continued)

*Primary Examiner* — Dangelino Gortayo
(74) *Attorney, Agent, or Firm* — Perkins Coie LLP

(57) ABSTRACT

A sysSQL technology for querying operating system states of multiple hosts in a cluster using a Structured Query Language (SQL) query is disclosed. An administrator of a cluster can use a graphical or text-based user interface to submit an SQL query to determine the operating system states of multiple hosts in parallel. The technology parses the SQL query to determine the datasets needed to execute the SQL query and aggregates those datasets from the multiple hosts. The technology then creates a temporary database to execute the SQL query and provides the results from the SQL query for display on the user interface.

20 Claims, 18 Drawing Sheets

(56) References Cited

U.S. PATENT DOCUMENTS

| | | |
|---|---|---|
| 7,031,981 B1 | 4/2006 | DeLuca et al. |
| 7,069,497 B1 | 6/2006 | Desai |
| 7,107,323 B2 | 9/2006 | Hara et al. |
| 7,143,288 B2 | 11/2006 | Pham et al. |
| 7,325,041 B2 | 1/2008 | Hara et al. |
| 7,392,421 B1 | 6/2008 | Bloomstein et al. |
| 7,487,228 B1 | 2/2009 | Preslan et al. |
| 7,496,829 B2 | 2/2009 | Rubin et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,685,109 B1 | 3/2010 | Ransil et al. |
| 7,698,321 B2 | 4/2010 | Hackworth |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,937,482 B1 | 5/2011 | Vermeulen et al. |
| 7,970,861 B2 | 6/2011 | Simitci et al. |
| 7,984,043 B1 | 7/2011 | Waas |
| 8,024,560 B1 | 9/2011 | Alten |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,306,919 B2 | 11/2012 | Sakamura et al. |
| 8,311,980 B2 | 11/2012 | Saito et al. |
| 8,468,244 B2 | 6/2013 | Redlich et al. |
| 8,484,716 B1 | 7/2013 | Hodgson et al. |
| 8,631,403 B2 | 1/2014 | Soundararajan et al. |
| 8,655,939 B2 | 2/2014 | Redlich et al. |
| 8,667,267 B1 | 3/2014 | Garcia et al. |
| 8,732,674 B1 | 5/2014 | Agha |
| 8,788,815 B1 | 7/2014 | Garcia et al. |
| 8,821,602 B2 | 9/2014 | McAlister |
| 9,047,019 B2* | 6/2015 | Florendo .............. G06F 3/0622 |
| 9,183,284 B2* | 11/2015 | Barsness ........... G06F 17/30563 |
| 9,235,618 B2* | 1/2016 | Sharma ............. G06F 17/30457 |
| 9,626,411 B1* | 4/2017 | Chang .............. G06F 17/30463 |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2004/0003322 A1 | 1/2004 | Collins et al. |
| 2004/0059728 A1 | 3/2004 | Miller et al. |
| 2004/0103166 A1 | 5/2004 | Bae et al. |
| 2004/0172421 A1 | 9/2004 | Saito et al. |
| 2004/0186832 A1 | 9/2004 | Jardin |
| 2005/0044311 A1 | 2/2005 | Lahiri et al. |
| 2005/0071708 A1 | 3/2005 | Bartfai et al. |
| 2005/0091244 A1 | 4/2005 | Marcotte |
| 2005/0138111 A1 | 6/2005 | Aton et al. |
| 2005/0171983 A1 | 8/2005 | Deo et al. |
| 2005/0182749 A1 | 8/2005 | Matsui |
| 2006/0020854 A1 | 1/2006 | Cardona et al. |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1 | 10/2006 | Nishimoto et al. |
| 2006/0247897 A1 | 11/2006 | Lin |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0282988 A1 | 12/2007 | Bornhoevd et al. |
| 2008/0104579 A1 | 5/2008 | Hartmann |
| 2008/0140630 A1 | 6/2008 | Sato et al. |
| 2008/0168135 A1 | 7/2008 | Redlich et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0070769 A1 | 3/2010 | Shima et al. |
| 2010/0131817 A1 | 5/2010 | Kong et al. |
| 2010/0179855 A1 | 7/2010 | Chen et al. |
| 2010/0198972 A1 | 8/2010 | Umbehocker |
| 2010/0296652 A1 | 11/2010 | Nakayama et al. |
| 2010/0306286 A1 | 12/2010 | Chiu et al. |
| 2010/0325713 A1 | 12/2010 | Kurita et al. |
| 2010/0332373 A1 | 12/2010 | Crabtree et al. |
| 2011/0004620 A1* | 1/2011 | Butler .................. G06F 19/327 707/769 |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 | 9/2011 | Bowers |
| 2011/0246816 A1 | 10/2011 | Hsieh et al. |
| 2011/0246826 A1 | 10/2011 | Hsieh et al. |
| 2011/0276396 A1 | 11/2011 | Rathod |
| 2011/0276495 A1 | 11/2011 | Varadarajan et al. |
| 2011/0302417 A1 | 12/2011 | Whillock et al. |
| 2011/0307534 A1 | 12/2011 | Peng et al. |
| 2012/0036146 A1 | 2/2012 | Annapragada |
| 2012/0036357 A1 | 2/2012 | Struik |
| 2012/0102072 A1 | 4/2012 | Jia et al. |
| 2012/0130874 A1 | 5/2012 | Mane et al. |
| 2012/0131341 A1 | 5/2012 | Mane et al. |
| 2013/0031240 A1 | 1/2013 | Byzek |
| 2013/0041872 A1 | 2/2013 | Aizman et al. |
| 2013/0054976 A1 | 2/2013 | Brown et al. |
| 2013/0218840 A1 | 8/2013 | Smith et al. |
| 2013/0304761 A1 | 11/2013 | Redlich et al. |
| 2014/0032528 A1* | 1/2014 | Mandre ............ G06F 17/30463 707/718 |
| 2014/0164353 A1* | 6/2014 | Shankar ............ G06F 17/30445 707/714 |
| 2014/0172898 A1* | 6/2014 | Aguilera ........... G06F 17/30575 707/759 |
| 2014/0188841 A1 | 7/2014 | Sun et al. |
| 2014/0195558 A1 | 7/2014 | Murthy et al. |
| 2014/0372533 A1* | 12/2014 | Fu .......................... H04L 67/10 709/204 |

OTHER PUBLICATIONS

Canada Exam Report for application No. 2843459, dated Aug. 5, 2014, 3 pages.

Chapter 25: Distributed Databases ED—Ramez Elmasri; Shamkant B Navathe (eds), Jan. 1, 2011 (Jan. 1, 2011), Fundamentals of Database Systems (Sixth Edition), Addison-Wesley, pp. 877-927.

Cheng, Security Attack Safe Modle and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pages, Aug. 2013.

Du et al., "A Pairwise Key Predistribution Scheme for Wireless Sensor Networks," ACM, May 2005, vol. 8 Issue 2, pp. 228-258.

European Search Report for European Application No. 14157984.7, dated Jun. 6, 2014, 10 pages.

Exam Report for GB1403929.1, Applicant: Cloudera, Inc, dated May 2, 2014, 6 pages.

Kim et al., Design and Implementation of a Private and Public Key Crypto Processor and Its Application to a Security System, IEEE, Feb. 2004, vol. %0, Issue 1, pp. 214-224.

(56) References Cited

OTHER PUBLICATIONS

Koe et al., "A Study of Encryption Algorithm for RFID tag (SEED: 8 Rounds X 64 bit block)," IEEE, s008, pp. 672-677.
Kossmann, Donald, "The State of The Art in Distributed Query Processing," ACM Computing Surveys, vol. 32, No. 4, Dec. 1, 2000, pp. 422-469.
Lamport, L., "Time, clocks, and the ordering of events in a distributed system," Communications of the ACM, vol. 21, No. 7, pp. 558-565, Jul. 1978.
Non-Final Office Action for U.S. Appl. No. 13/362,695, dated Apr. 29, 2013, 23 pgs.
Stoller,S.D., "Detecting global predicates in distributed systems with clocks," Distributed Computing, vol. 13, No. 2, pp. 85-98, Feb. 2000.
Tamer Dzsu et al: "Principles of Distributed Database Systems", Principles of Distributed Database Systems, XX, XX, Jan. 1, 1991 (Jan. 1, 1991), pp. 74-93.
Beomseok Nam et al: "Spatial indexing of distributed multidimensional datasets", Cluster Computing and the Grid, 2005. CCGRID 2005. IEEE International Symposium on Cardiff~Wales, UK May 9-12, 2005, Piscataway, NJ, USA, IEEE, Piscataway, NJ, USA, vol. 2, May 9, 2005, pp. 743-750.

\* cited by examiner

```
[root@nightly47-1 ~]# (for x in nightly47-{1..8}.ent.cloudera.com; do ssh $x ps -A --no-headers
-o user; done) | sort | uniq -c | sort -rn
    669 root
     12 solr
     12 hdfs
     11 mapred
     10 hbase
      8 qpidd
      8 ntp
      8 nscd
      8 mysql
      8 dbus
      8 cloudera-scm
      7 hue
      5 yarn
      5 impala
      2 zookeeper
      2 oozie
      2 hive
      1 sqoop2
[root@nightly47-1 ~]#
```

FIG. 4

Results

8 rows returned, 0.006 total query time, 0.9328589999999224 CPU time on agents, 403.2 KiB transferred, 8/8 fetches successful.

Showing 1 to 8 of 8 entries  First Previous [1] Next Last  Show [50] entries

| hostname | count(*) |
|---|---|
| nightly47-1.ent.cloudera.com | 145 |
| nightly47-5.ent.cloudera.com | 97 |
| nightly47-2.ent.cloudera.com | 92 |
| nightly47-3.ent.cloudera.com | 91 |
| nightly47-4.ent.cloudera.com | 91 |
| nightly47-6.ent.cloudera.com | 86 |
| nightly47-7.ent.cloudera.com | 86 |
| nightly47-8.ent.cloudera.com | 86 |

Showing 1 to 8 of 8 entries  First Previous [1] Next Last  Show [50] entries

Results 8 rows returned, 0.004 total query time, 0.82587/9999998618 CPU time on agents, 403.6 KiB transferred, 8/8 fetches successful.

Cumulative CPU
Free Space
Network Connections
Listening Daemons
Pairwise Process Connections Logs(0) | Counters

620

Showing 1 to 8 of 8 entries  First Previous [1] Next Last  Show [50] entries

| hostname | sum(mem_rss)/1024.0/1024.0 |
|---|---|
| nightly47-1.ent.cloudera.com | 5261.91796875 |
| nightly47-5.ent.cloudera.com | 1423.953125 |
| nightly47-3.ent.cloudera.com | 1055.53125 |
| nightly47-2.ent.cloudera.com | 1052.4140625 |
| nightly47-4.ent.cloudera.com | 1044.984375 |
| nightly47-8.ent.cloudera.com | 483.66015625 |
| nightly47-6.ent.cloudera.com | 482.4453125 |
| nightly47-7.ent.cloudera.com | 472.09765625 |

Showing 1 to 8 of 8 entries  First Previous [1] Next Last  Show [50] entries

*FIG. 6B*

Results

8 rows returned, 0 total query time, 0.005999999999943384 CPU time on agents, 2.8 KiB transferred, 8/8 fetches successful.

Showing 1 to 8 of 8 entries  First Previous [1] Next Last  Show [50] entries

| hostname | mountpoint | free |
| --- | --- | --- |
| nightly47-1.ent.cloudera.com | / | 3831087 9232 |
| nightly47-2.ent.cloudera.com | / | 4225634 7136 |
| nightly47-4.ent.cloudera.com | / | 4225725 2352 |
| nightly47-3.ent.cloudera.com | / | 4259496960 |
| nightly47-5.ent.cloudera.com | / | 4507020 0832 |
| nightly47-8.ent.cloudera.com | / | 4568760 3200 |
| nightly47-6.ent.cloudera.com | / | 4568337 2032 |
| nightly47-7.ent.cloudera.com | / | 4569155 1744 |

Showing 1 to 8 of 8 entries  First Previous [1] Next Last  Show [50] entries

Logs(0) | Counters

Cumulative CPU
Free Space
Network Connections
Listening Daemons
Pairwise Process Connections

```
cloudera manager
Home  Services ▼  Hosts  Activities ▼  Diagnose ▼  Audits  Charts ▼  Reports  Administration ▼

All Hosts

♦Status  ✱Configuration  ⊞Templates  ♯Parcels  ◘ SysSQL

SysSQL

DROP TABLE IF EXISTS p0;
    CREATE TEMPORARY TABLE p0 AS SELECT * FROM processes;
    SELECT 0 WHERE sleep(2) = 0;
    SELECT 0 WHERE clear_cache() = 0;
    SELECT p0.hostname, p0.pid, p0.name,
    round(100*(p1.cpu_system + p1.cpu_user – p0.cpu_system – p0.cpu_user)2, 3)
    AS "CPU Percentage",                                                      — 812
    round(p1.mem_rss/1024.0/1024.0, 2) AS "RSS (MiB)"
    FROM p0, processes p1
    WHERE p0.pid = p1.pid AND p0.hostname = p1.hostname Fetch Timeout ❓ [ 10 ⇅ ]
Query Timeout ❓ [ 10 ⇅ ]

Execute »
```

Help
Overview ❓
Query Syntax ❓

Schemas
processes
threads
connections
hosts
mounts
network interfaces

Examples
Top CPU Consumers
Connections by State
Processes by User
Cumulative CPU

*FIG. 8A*

Results

773 rows returned, 2.039 total query time, 1.57176199999999783 CPU time on agents, 805.9 KiB transferred, 16/16 fetches successful.
820

Showing 1 to 50 of 773 entries  First Previous 1 2 3 4 5 Next Last  Show 50 entries

| 0 | pid | name | CPU Percentage | RSS (MiB) |
|---|---|---|---|---|
| nightly47-1.ent.cloudera.com | 2868 | python | 16.0 | 72.23 |
| nightly47-1.ent.cloudera.com | 2694 | java | 8.5 | 559.88 |
| nightly47-2.ent.cloudera.com | 19581 | python | 6.0 | 66.91 |
| nightly47-4.ent.cloudera.com | 17294 | python | 6.0 | 66.91 |
| nightly47-3.ent.cloudera.com | 23829 | python | 5.5 | 67.02 |
| nightly47-6.ent.cloudera.com | 7871 | python | 5.0 | 64.61 |
| nightly47-5.ent.cloudera.com | 26770 | python | 5.0 | 65.11 |
| nightly47-8.ent.cloudera.com | 11954 | python | 5.0 | 66.54 |
| nightly47-1.ent.cloudera.com | 16773 | java | 5.0 | 460.36 |

*FIG. 8B*

Results

237 rows returned, 0.025 total query time, 5.1062249999999796 CPU time on agents, 711.9 KiB transferred, 8/8 fetches successful.

Showing 1 to 50 of 237 entries   First Previous  1  2 3 4 5 Next Last    Show 50 entries

| p1.hostname \|\|*:*\|\| p1.pid \|\|*:*\|\| p1.name \|\|*:*\|\| p1.username | p2.hostname \|\|*:*\|\| p2.pid \|\|*:*\|\| p2.name \|\|*:*\|\| p2.username | local_port | remote_port | hostname | pid | fd | family | type | local_h |
|---|---|---|---|---|---|---|---|---|---|
| nightly47-1.ent.cloudera.com:1490:mysql | nightly47-1.ent.cloudera.com:2694:java: cloudera-scm | 3306 | 54102 | nightly47-1.ent.clouder.c om | 1490 | 173 | 2 | 1 | 127.0. |
| nightly47-1.ent.cloudera.com:1490:mysql | nightly47-1.ent.cloudera.com:16773:java: cloudera-scm | 3306 | 47489 | nightly47-1.ent.clouder.c om | 1490 | 145 | 2 | 1 | 10.20. |
| nightly47-1.ent.cloudera.com:1490:mysql | nightly47-1.ent.cloudera.com:16789:java: cloudera-scm | 3306 | 44591 | nightly47-1.ent.clouder.c om | 1490 | 126 | 2 | 1 | 10.20. |
| nightly47-1.ent.cloudera.com:1490:mysql | nightly47-1.ent.cloudera.com:16722:java: cloudera-scm | 3306 | 56849 | nightly47-1.ent.clouder.c om | 1490 | 137 | 2 | 1 | 10.20. |
| • • • | • • • | | | • • • | | | | | |
| nightly47-1.ent.cloudera.com:8624:java: hdfs | nightly47-4.ent.cloudera.com:21829:java: hbase | 8020 | 33136 | nightly47-1.ent.clouder.c om | 8624 | 202 | 2 | 1 | 10.20. |

*FIG. 9B*

QUERYING OPERATING SYSTEM STATE ON MULTIPLE MACHINES DECLARATIVELY

BACKGROUND

In a computer system, a kernel is a program that comprises a central core of the computer's operating system. A shell (e.g., bash, csh, ksh, etc., in Unix-based operating systems) is a program and a component of the operating system that interacts with user commands. The shell therefore acts as an interface and a command interpreter for executing user commands. The commands can be programs or tools for performing simple tasks such as reporting a snapshot of the current processes (via the "ps" command) and ascertaining memory usage per process. Users can also combine a set of the shell commands to perform more complex tasks, create shell scripts and save the shell scripts for future use.

BRIEF DESCRIPTION OF THE DRAWINGS

FIG. 4 is a user interface diagram illustrating use of a sequence of commands on a shell interface to execute the query of FIG. 3 to obtain results similar to that displayed in FIG. 4.

FIG. 5B is a graphical user interface diagram illustrating a results table displaying results of the query of FIG. 5A.

FIG. 6A is a graphical user interface diagram illustrating a graphical user interface for issuing a third example sysSQL query on multiple hosts.

FIG. 6B is a graphical user interface diagram illustrating a results table displaying results of the query of FIG. 6A.

FIG. 7B is a graphical user interface diagram illustrating a results table displaying results of the query of FIG. 7A.

FIG. 8A is a graphical user interface diagram illustrating a graphical user inter-face for issuing a fifth example sysSQL query on multiple hosts.

FIG. 8B is a graphical user interface diagram illustrating a results table displaying results of the query of FIG. 8A.

FIG. 9B is a graphical user interface diagram illustrating a results table displaying results of the query of FIG. 9A.

DETAILED DESCRIPTION

Figure 1:
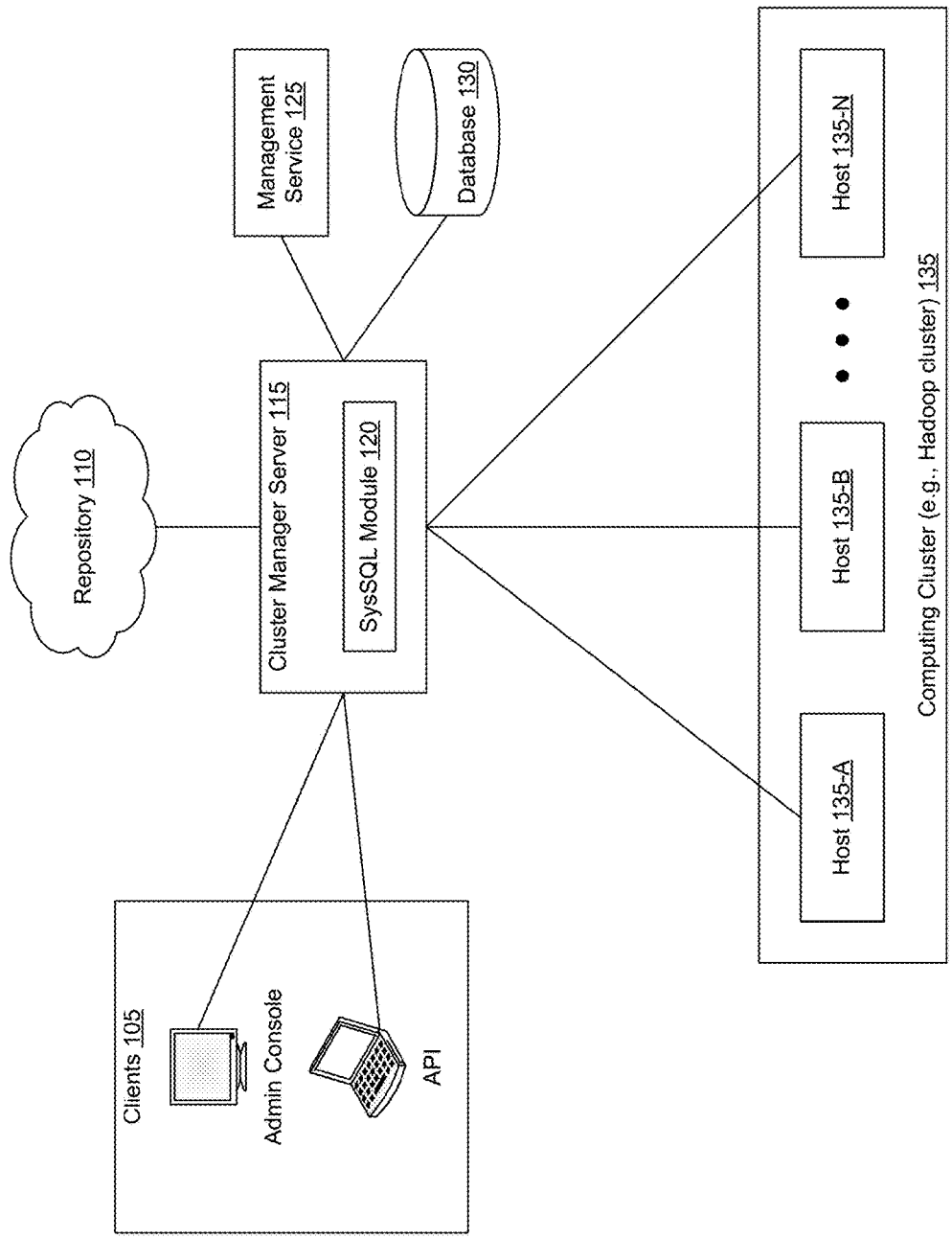
FIG. 1 is a block diagram illustrating an example environment in which the disclosed sysSQL technology for querying operating system state on multiple machines declaratively can operate.

Operating Systems (e.g., Linux) expose a large amount of system information that are accessible through various system calls, files, interfaces, libraries, and/or the like. The system information can include monitoring and diagnostic data and/or other data that provide an indication of the operating system state. For example, the "/proc" file system contains system information such as system memory, device mounted, hardware configuration, and so on. Many commands/utilities simply make calls to files in the /proc file system directory to get data. Querying such data encounters two hurdles. Firstly, there is a different way to access and parse different types of data. Secondly, combining this data across machines or hosts requires yet more scripting. The "sysSQL" technology disclosed herein can bridge both of those hurdles by exposing a consistent, declarative interface, based on Structured Query Language (SQL) like language, to a wide range of system information, and by running queries, not just on a single machine, but across a cluster of machines. Via the sysSQL interface, users can ask questions like "what processes are using the most CPU across machines" or "how many network connections are there per machine" using SQL that they are familiar with, without having to write shell scripts.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be higighlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 is a block diagram illustrating an example environment in which the disclosed sysSQL technology for querying operating system states of multiple machines declaratively can operate.

In some embodiments, the example environment includes a cluster manager server 115 that manages a cluster 135 of host machines ("hosts") 135A-N and services. A cluster 135, as used herein, is a logical entity that includes a set of hosts (e.g., hosts 135A-N) that runs instances of services. As used herein a service is a category of functionality. Examples of services include the Hadoop Distributed File System (HDFS), MapReduce, YARN, and/or the like. A host (e.g., hosts 135A-N), as used herein, includes a physical or virtual machine that runs an instance of a role. As used herein a role is a category of functionality within a service. For example, the HDFS service can have the following example roles: a namenode, a secondary namenode, datanode and balancer. In a distributed system, one service runs on multiple hosts. In some embodiments, the cluster manager server 115 can be in communication with a repository 110 that can store data such as software, updates, policies etc., for deployment.

In some embodiments, the cluster manager server 115 can be in communication with a management service 125 that consists of a set of roles, for example, an activity monitor, a host monitor, a service monitor, reports manager, and/or the like. Configuration information (e.g., cluster configuration information), monitoring information and/or other information associated with a cluster can be stored in a database 130. The database 130 can include multiple logical databases running across one or more database servers. In some embodiments, the client 105 is an interface for interacting with the cluster manager server 115. The client 105 can include an admin console which is a web-based user interface (UI) or graphical user interface (GUI) that an administrator ("admin") can use to interact with the cluster manager server 115 and manage one or more clusters (e.g., cluster 135). The client 105, in some embodiments, can also include one or more application programming interfaces (APIs) used by other applications to manage the cluster.

In some embodiments, a sysSQL module 120 can provide a sysSQL interface on the admin console using which admin users can run queries on multiple machines declaratively, using SQL or SQL-like language. In some other embodiments, the sysSQL module 120 can be hosted on the cluster manager server 115, while in other embodiments, the sysSQL module 120 can be hosted on another machine (e.g., a dedicated machine).

As described above, the sysSQL is a query language for ascertaining a current state of a distributed system having multiple hosts. The sysSQL operates on the same data sets that other system commands such as lsof, ps, mount, df, top, netstat, ifconfig, and so on operate on. The sysSQL however aggregates those data sets from multiple hosts and converts the aggregated data sets into a form that is queriable. For example, sysSQL can convert data returned by the /proc file system, which is a virtual file system, into a processes or threads table or dataset. An example excerpt of information returned when a "list processes" (e.g., ps aux) command is issued on a shell in a Linux machine is provided below.

| USER | PID | % CPU | % MEM | VSZ | RSS | TTY | STAT | START | TIME | COMMAND |
|------|-----|-------|-------|-----|-----|-----|------|-------|------|---------|
| solr | 17057 | 0.3 | 2.4 | 2778764 | 243220 | ? | Sl | 06:12 | 0:59 | /usr/java/jdk1.7.0_67-cloudera/bin/java -Djava.util.logging.config.file=/var/lib/solr/tomcat-deployment |
| solr | 17304 | 0.0 | 0.0 | 106252 | 1000 | ? | S | 06:12 | 0:00 | /bin/bash /opt/cloudera/parcels/CDH-5.2.0-1.cdh5.2.0.p0.18/lib/solr/bin/solrd run |
| mapred | 18099 | 0.4 | 1.9 | 777616 | 195884 | ? | Sl | 06:15 | 1:21 | /usr/java/jdk1.7.0_67-cloudera/bin/java -Dproc_historyserver -Xmx1000m -Dhadoop.log.dir=/var/log/hadoop |
| yarn | 18249 | 2.0 | 1.9 | 935428 | 201216 | ? | Sl | 06:15 | 6:17 | /usr/java/jdk1.7.0_67-cloudera/bin/java -Dproc_resourcemanager -Xmx1000m -Djava.net.preferIPv4Stack=tru |
| sqoop2 | 18837 | 0.1 | 1.7 | 1933268 | 180392 | ? | Sl | 06:16 | 0:26 | /usr/java/jdk1.7.0_67-cloudera/bin/java -Djava.util.logging.config.file=/var/run/cloudera-scm-agent/pro |
| spark | 20896 | 0.1 | 1.3 | 2119592 | 136412 | ? | Sl | 06:21 | 0:26 | /usr/java/jdk1.7.0_67-cloudera/bin/java -cp ::/opt/cloudera/parcels/CDH-5.2.0-1.cdh5.2.0.p0.18/lib/spar |
| root | 21609 | 0.0 | 0.0 | 10732 | 228 | ? | S< | Oct04 | 0:00 | /sbin/udevd -d |
| root | 21610 | 0.0 | 0.0 | 10732 | 228 | ? | S< | Oct04 | 0:00 | /sbin/udevd -d |
| flume | 21836 | 0.2 | 2.3 | 3471640 | 242580 | ? | Sl | 06:24 | 0:43 | /usr/java/jdk1.7.0_67-cloudera/bin/java -xmx20m -Djava.net.preferIPv4Stack=true -Duser.home=/var/lib/fl |
| root | 25247 | 0.0 | 0.0 | 96192 | 3716 | ? | S | 11:18 | 0:00 | sshd: root@pts/0 |
| root | 25251 | 0.0 | 0.0 | 106464 | 1820 | pts/0 | Ss | 11:18 | 0:00 | -bash |

The information for the above can in turn be looked up in /proc file system. Each of the above entries represent a process on that machine. Each process has content such as sub-directories containing data. For example, a process with a process id 10122 can have the following example content:

```
[root@nightly-1 ~]# ls /proc/10122
attr            cpuset    limits      net             root        statm
autogroup       cwd       loginuid    numa_maps       sched       status
auxv            environ   maps        oom_adj         schedstat   syscall
cgroup          exe       mem         oom_score       sessionid   task
clear_refs      fd        mountinfo   oom_score_adj   smaps       wchan
cmdline         fdinfo    mounts      pagemap         stack
coredump_filter io        mountstats  personality     stat
```

Data from each of these sub-directories provide system information that can be converted into a queryable form using the sysSQL technology.

In some embodiments, the sysSQL technology can use a schema in converting the "raw" system information (e.g., from the /proc file system) into a queryable form. Some examples of schemas that the sysSQL technology can use are provided below. For example, an example schema for creating a "processes" table can include the following columns:

```
{
  "columns":[
    "hostname",
    "pid",
    "name",
    "cmdline",
    "create_time",
    "exe",
    "cwd",
    "gid",
    "ppid",
    "uid",
    "username",
    "cpu_user",
    "cpu_system",
    "mem_rss",
    "mem_vms"
  ],
  "help":"The processes running on all hosts. Roughly analogous to the 'ps' command.",
  "name":"processes"
},
```

An example schema for creating a "threads" table can have the following columns:

```
{
  "columns":[
    "hostname",
    "pid",
    "tid",
    "cpu_user",
    "cpu_system"
  ],
  "help":"Threads running on all hosts. Roughly analogous to the 'ps H' command.",
  "name":"threads"
},
```

An example schema for creating a "connections" table can having the following columns:

```
{
  "columns":[
    "hostname",
    "pid",
```

-continued

```
    "fd",
    "family",
    "type",
    "local_host",
    "local_port",
    "remote_host",
    "remote_port",
    "status"
  ],
  "help":"Network connections by process. Roughly analogous to 'lsof -i -n -P'.",
  "name":"connections"
},
```

An example schema for creating a "hosts" table can having the following columns:

```
{
  "columns":[
    "hostname",
    "os",
    "os_version",
    "uptime",
    "num_cpus"
  ],
  "help":"Hosts. Includes uptime and os version.",
  "name":"hosts"
}
```

An example schema for creating a "mounts" table can having the following columns:

```
{
  "columns":[
    "hostname",
    "device",
    "mountpoint",
    "fstype",
    "total",
    "used",
    "free"
  ],
  "help":"Filesystem mounts, roughly analogous to the 'df' and 'mount' commands.",
  "name":"mounts"
}
```

An example schema for creating a "network interfaces" table can having the following columns:

```
{
  "columns":[
    "hostname",
    "iface",
    "hw_addr",
    "inet_addr",
    "inet_bcast",
    "inet_mask",
    "inet6_addr",
    "inet6_bcast",
    "inet6_mask"
  ],
  "help":"Installed network interfaces, roughly analogous to the 'ifconfig' command.",
  "name":"network_interfaces"
}
```

Figure 2:
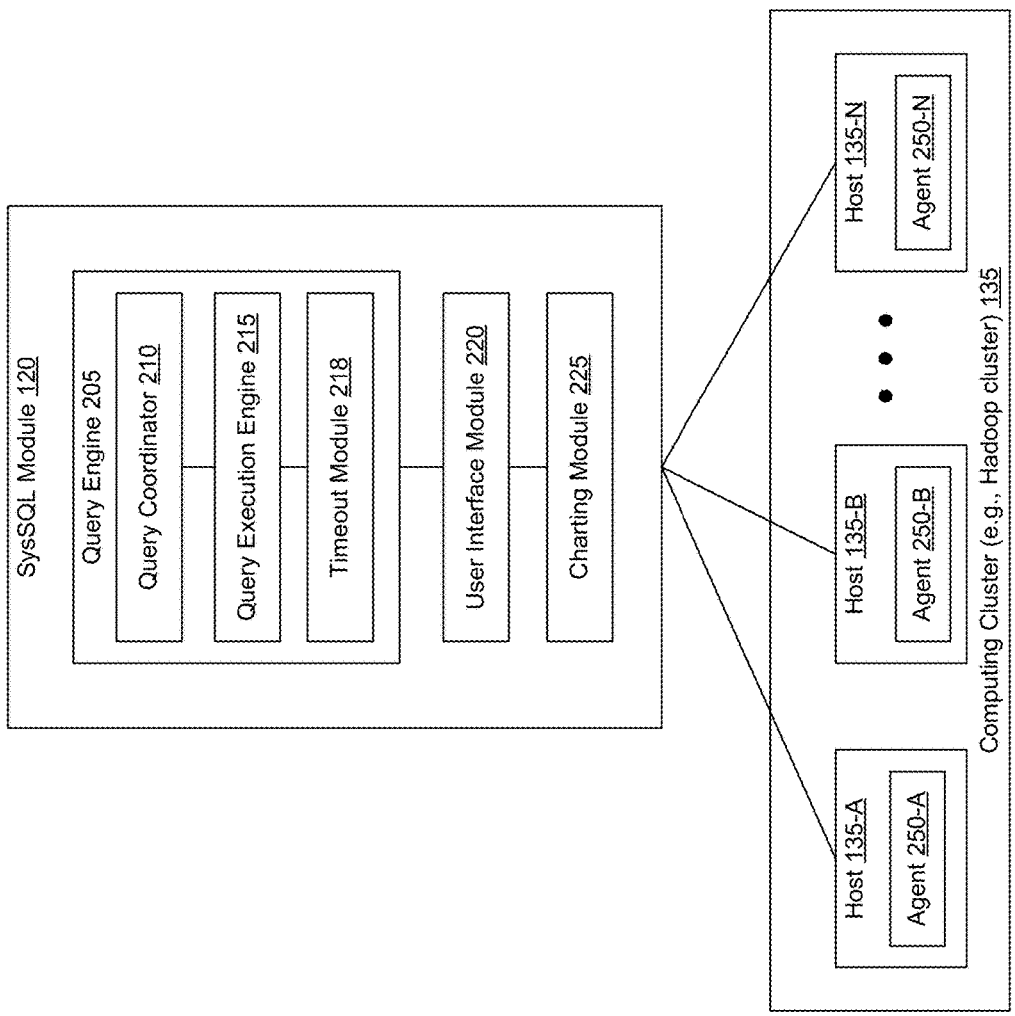
FIG. 2 is a block diagram illustrating example components of a sysSQL module and hosts of a computing cluster.

FIG. 2 is a block diagram illustrating example components of a sysSQL module 120 and hosts 135A-N of a computing cluster 135. In some embodiments, the sysSQL module 120 can include a query engine 205 having a query coordinator 210 and a query execution engine 215, a user interface module 220 and a cluster visualization module 225. More or less modules can be included in other embodiments. The sysSQL module 120 can communicate with each of the hosts 135A-N in the computing cluster 135.

In some embodiments, the user interface module 22( ) provides a user interface in the admin console for an admin user to input a query. An example of a query that can be submitted to the sysSQL module 120 via the user interface of the admin console is provided below.

```
SELECT hostname, status, count(*)
FROM connections
GROUP BY hostname, status
ORDER BY count(*) DESC
```

The above query requests the number of connections per state per host. A query coordinator 210 can receive the query and determine that a "connections" table (or dataset) is needed to execute the query. Unlike a traditional database system, the "connections" table on which the query is to performed does not exist when the query is received, but is materialized, at runtime, in response to the query. The query coordinator 210 can request all the hosts 135A-N (or the hosts specifically identified in the query in some embodiments) in the cluster 135 to send their "connections" tables.

In some embodiments, each host has an agent (e.g., agent 250-A, 250-B, . . . or 250-N) installed on it or residing therein. The agent is responsible for providing data that is requested by the query coordinator 210. For example, an agent of each host receiving the request from the query coordinator 210 can create a "connections table." In some embodiments, information necessary to create the "connections" table can be obtained by iterating through data provided by the /proc file system or similar interface or API. The /proc file system provides an interface to the internal data structure of the kernel and can return system-level information. In some embodiments, the agent can include adapters to format the system-level information into tables according to table schemas. For example, an adapter can use the schema for the "connections" table to format the system-level information and generate a "connections" table that has a uniform tabular format with the columns defined in the schema. In some embodiments, each agent can also be responsible for other functions such as starting and stopping processes, monitoring, or the like. In some embodiments, remote shells can be used to aggregate datasets from the hosts. In such embodiments, the hosts can include remote shell daemons to gather the datasets to return to the coordinator 210.

Each agent can return its "connections" table to the coordinator 210. The coordinator 210 can create a temporary database using the "connections" tables aggregated from the hosts so that the query execution engine 215 can execute the query on the temporary database. As soon as the query execution engine 215 receives results of the query, the query coordinator 210 can discard the temporary database. In some embodiments, the sysSQL module 120 can include a charting module that can generate graphical diagrams or visualizations using query results.

In some embodiments, the sysSQL module 120 can also handle timeouts associated with fetching datasets from the hosts and/or executing a query via a timeout module 218. In some embodiments, the timeout module 218 can be configured with timeout settings (e.g., fetch timeout, query timeout) specified by the user or by default. Having a timeout on how long the sysSQL module 120 should wait to get the underlying dataset means that the query engine 205 need not wait until it has the entire dataset to execute the query. Instead, after the timeout, the query engine 205 can execute the query on a partial dataset and provide results of the query to the user. This ensures a balance between interactivity (e.g., giving users a result quickly) and correctness (e.g., getting all the data). For example, consider a scenario where there are 100 hosts in a cluster and 3 of them are turned off or too busy to respond to the request from the query engine 205. The query engine 205 then waits until the request times out (e.g., based on an indication from the timeout module 218) and executes the query on the partial dataset (97% of the dataset in this example). In some embodiments, the sysSQL module 120 can also provide feedback to the user if part of the dataset is missing. Similarly, when the query times out (e.g., when the query takes longer than a 10 second query time timeout), the query engine 205 can provide a partial set of query results obtained so far.

Figure 3A:
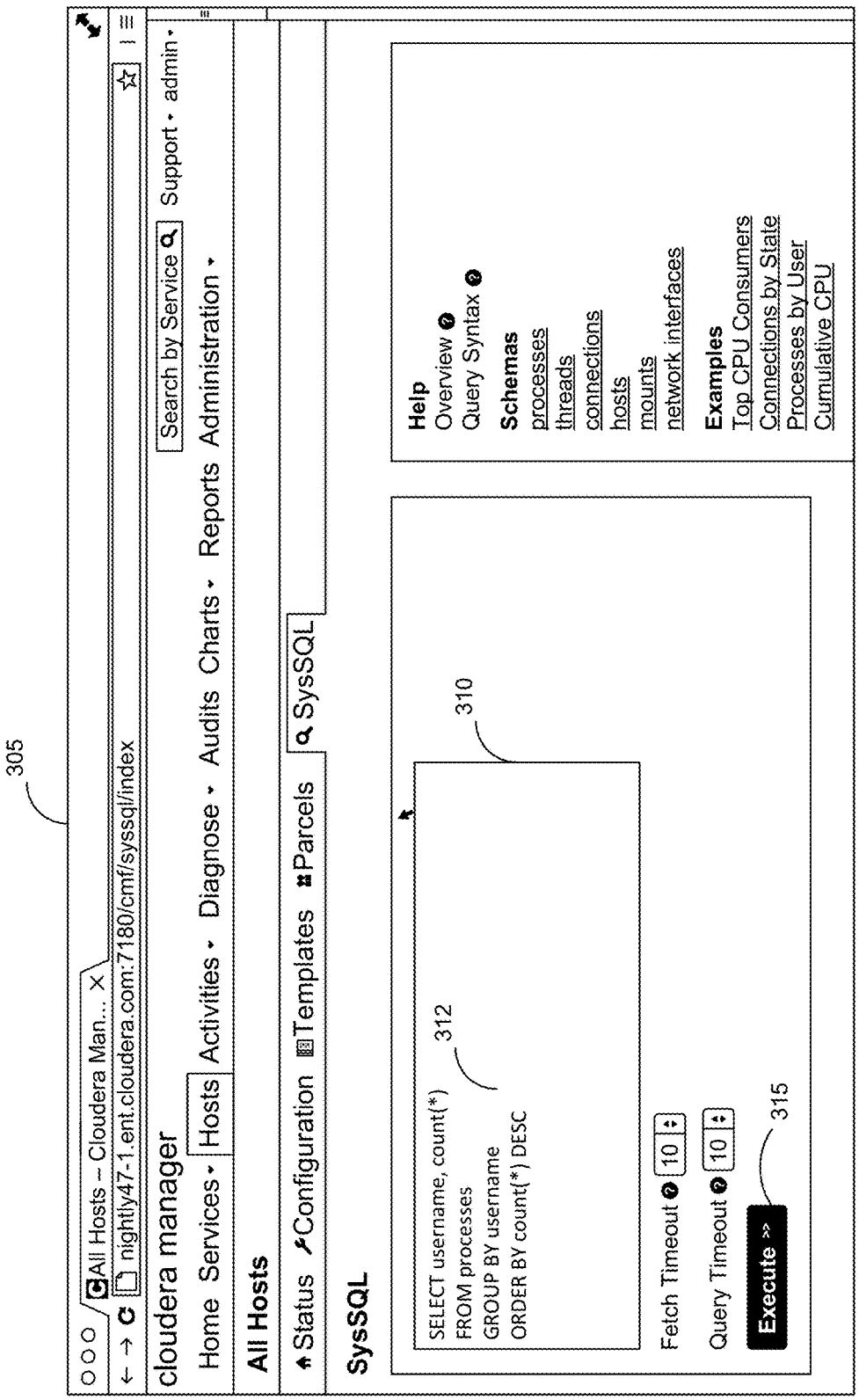
FIG. 3A is a graphical user interface diagram illustrating a graphical user interface for issuing a first example sysSQL query on multiple hosts.
Figure 3B:
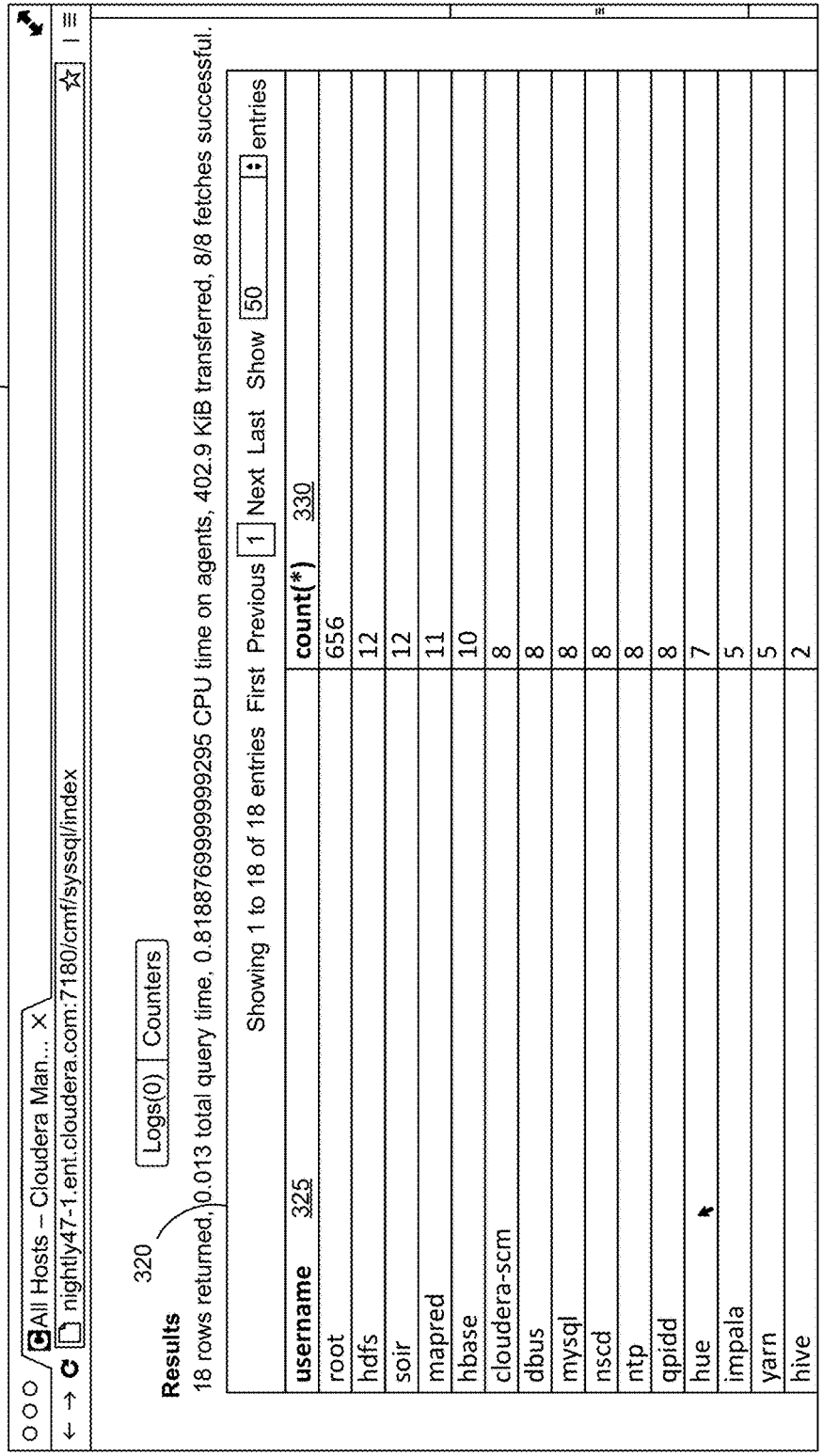
FIG. 3B is a graphical user interface diagram illustrating a results table displaying results of the query of FIG. 3A.

FIG. 3A is a graphical user interface diagram illustrating a graphical user interface for issuing a first example sysSQL query on multiple hosts. FIG. 3B is a graphical user interface diagram illustrating a results table displaying results of the query of FIG. 3A.

A web-based interface 305 (e.g., an admin console) includes a text box 310 that receives a sysSQL query 312 as input. The sysSQL query 312 can be written using the SQL syntax in some embodiments. In this example, the sysSQL query 312 asks the question "how many processes are running in a cluster per user?" When the execute button 315 is selected, the sysSQL module 120 receives and executes the sysSQL query 312 to generate the results table 320, displayed on the web-based user interface 305 shown in FIG. 3B. The results table 320, in this example, includes a username column 325 and a count column 330. Thus, from the results table 320, it can be determined that the "root" user is running 656 processes, while the "hive" user is running 2 processes.

This same query can be run from the text-based shell interface of Unix/Linux-based systems and will provide similar results. For example, shell interface 405 of FIG. 4 shows a sequence of commands are needed to specify, all the hosts (e.g., hosts 1-8 in this example), connect to each host, specify all processes, remove the headers, output just the username, sort the results, count the entries and sort again reverse numerically in order to return the output that lists the usernames and the number of processes for each username. Thus, it can be seen that it is much simpler to run the same query using sysSQL than using the shell, although the results are similar. In some embodiments, instead of the web-based interface, a text-based shell interface can be used by a user to input a sysSQL query spanning multiple hosts.

Figure 5A:
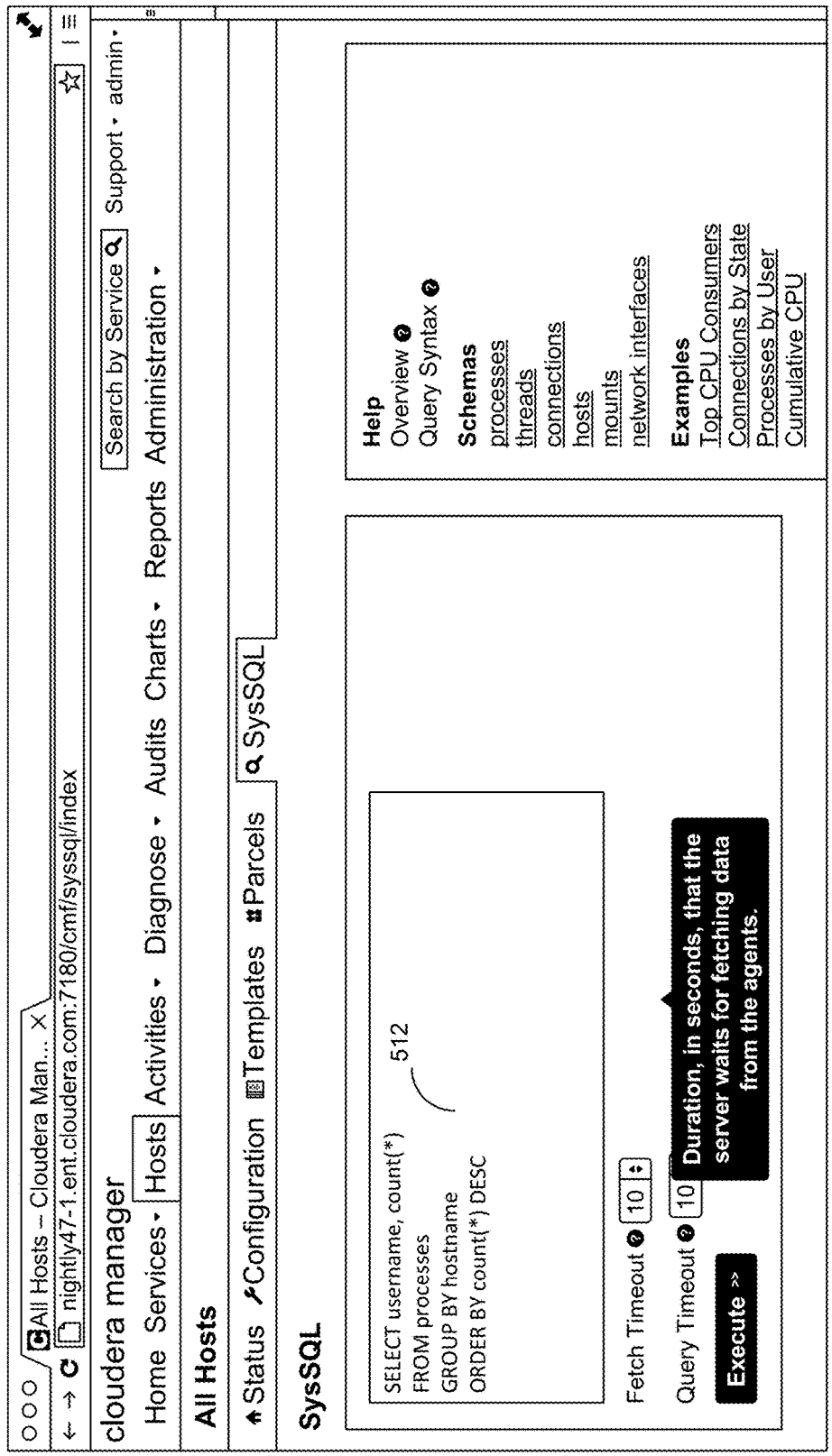
FIG. 5A is a graphical user interface diagram illustrating a graphical user interface for issuing a second example sysSQL query on multiple hosts.

FIG. 5A is a graphical user interface diagram illustrating a graphical user interface for issuing a second example sysSQL query on multiple hosts. FIG. 5B is a graphical user interface diagram illustrating a results table displaying results of the query of FIG. 5A.

In this case, the sysSQL query 512 requests the number of processes per host. Once again, the sysSQL query 512 is written in SQL using common SQL statements such as SELECT, FROM, GROUP BY and ORDER BY. However, there is no "processes" table to select from. This "processes" table encompassing all hosts in the cluster is created on the fly when the execute button is selected in order to execute the sysSQL query 512. The results from the execution of the sysSQL query 512 is displayed in the results table 520. The hostname column lists all the hosts and the count column lists the number of processes per host. In this example, there are 8 hosts and the first host is running the most number of processes.

Figure 6A:
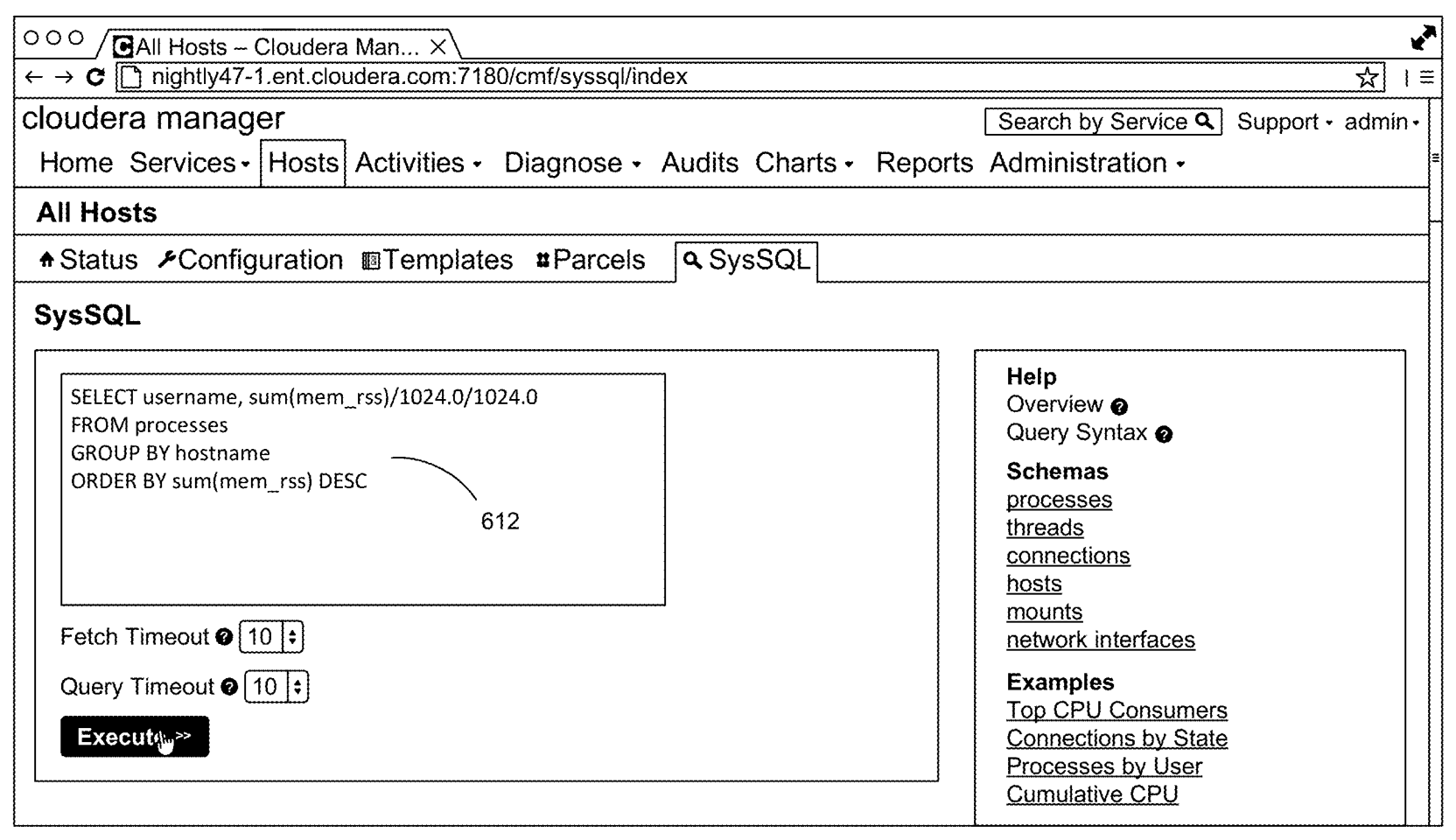

FIG. 6A is a graphical user interface diagram illustrating a graphical user interface for issuing a third example sysSQL query on multiple hosts. FIG. 6B is a graphical user interface diagram illustrating a results table displaying results of the query of FIG. 6A.

In this example, the example sysSQL query 612 requests memory usage information for each host. The sysSQL query 612 is directed to the "processes" table with a column "mem_rss" for memory held by each process. When the execute button is selected, the sysSQL module 120 obtains "processes" table from the hosts and uses a temporary database to execute the sysSQL query 612 to select from the "processes" table, for each host, a sum of the memory held by all processes running on the host. FIG. 6B shows the results table 620 from the sysSQL query 612. The results table 620 includes a column that lists the names of all the hosts and another column that lists the total memory (in GB) held by the hosts.

Figure 7A:
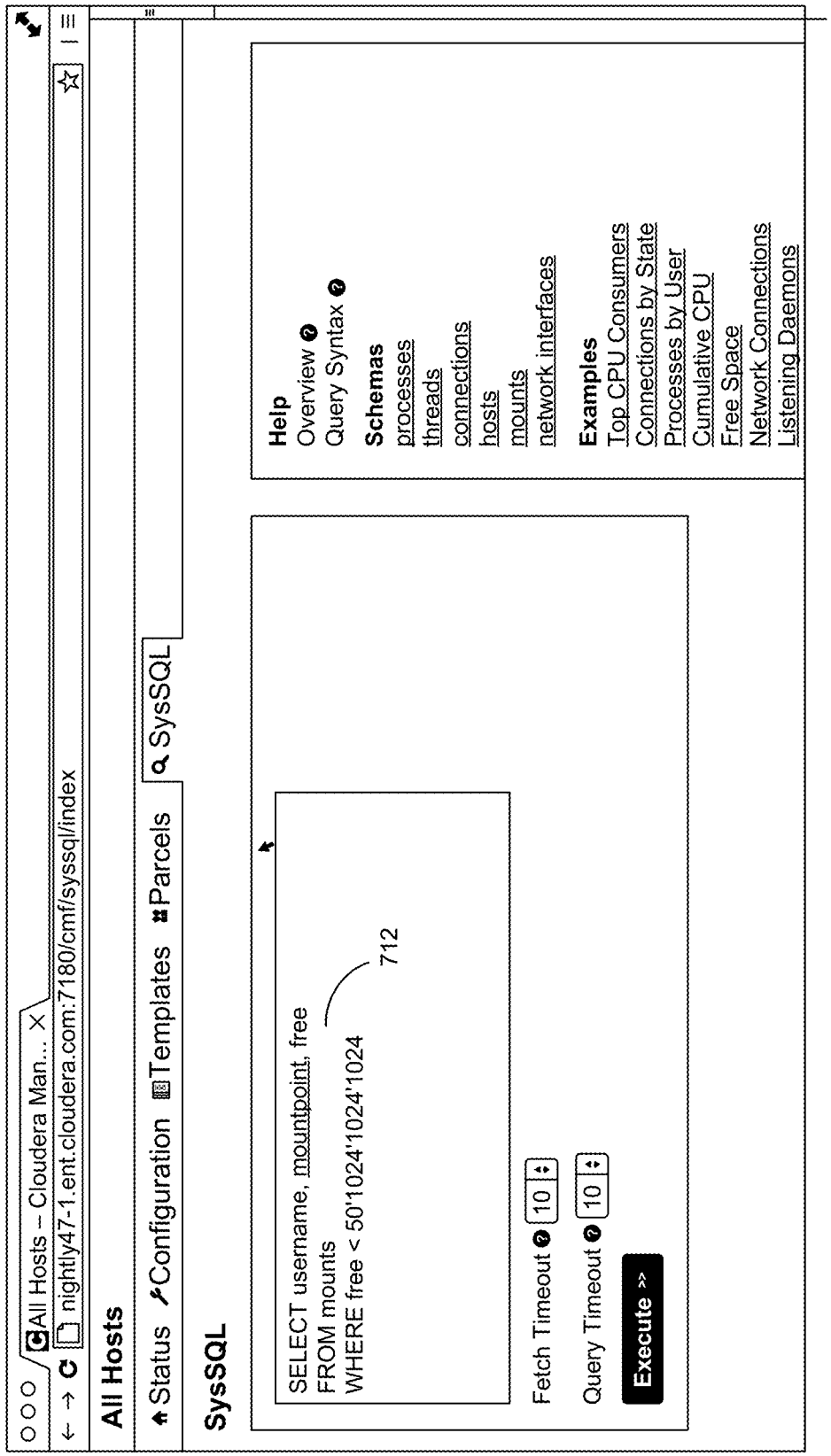
FIG. 7A is a graphical user interface diagram illustrating a graphical user interface for issuing a forth example sysSQL query on multiple hosts.

FIG. 7A is a graphical user interface diagram illustrating a graphical user interface for issuing a forth example sysSQL query on multiple hosts. FIG. 71B is a graphical user interface diagram illustrating a results table displaying results of the query of FIG. 7A.

In this case, the sysSQL query 712 acts on a "mounts" table, the schema for which indicates that it has data fields that include hostname, device, mountpoint, fstyp, fstype, total, used and free. The sysSQL query 712 requests a list of hosts having less than 50 GB of disk space. When the execute button is selected, the sysSQL module obtains from each host its own "mounts" table and creates a temporary database including the "mounts" table from the hosts to execute the sysSQL query 712. The results from query can be displayed on a results table 720 shown in FIG. 7B. The results table 720, as shown, lists the hostnames of the hosts in one column and the free space of the hosts, which are all less than 50 GB, in another column.

FIG. 8A is a graphical user interface diagram illustrating a graphical user interface for issuing a fifth example sysSQL query on multiple hosts. FIG. 8B is a graphical user interface diagram illustrating a results table displaying results of the query of FIG. 8A.

Figure 9A:
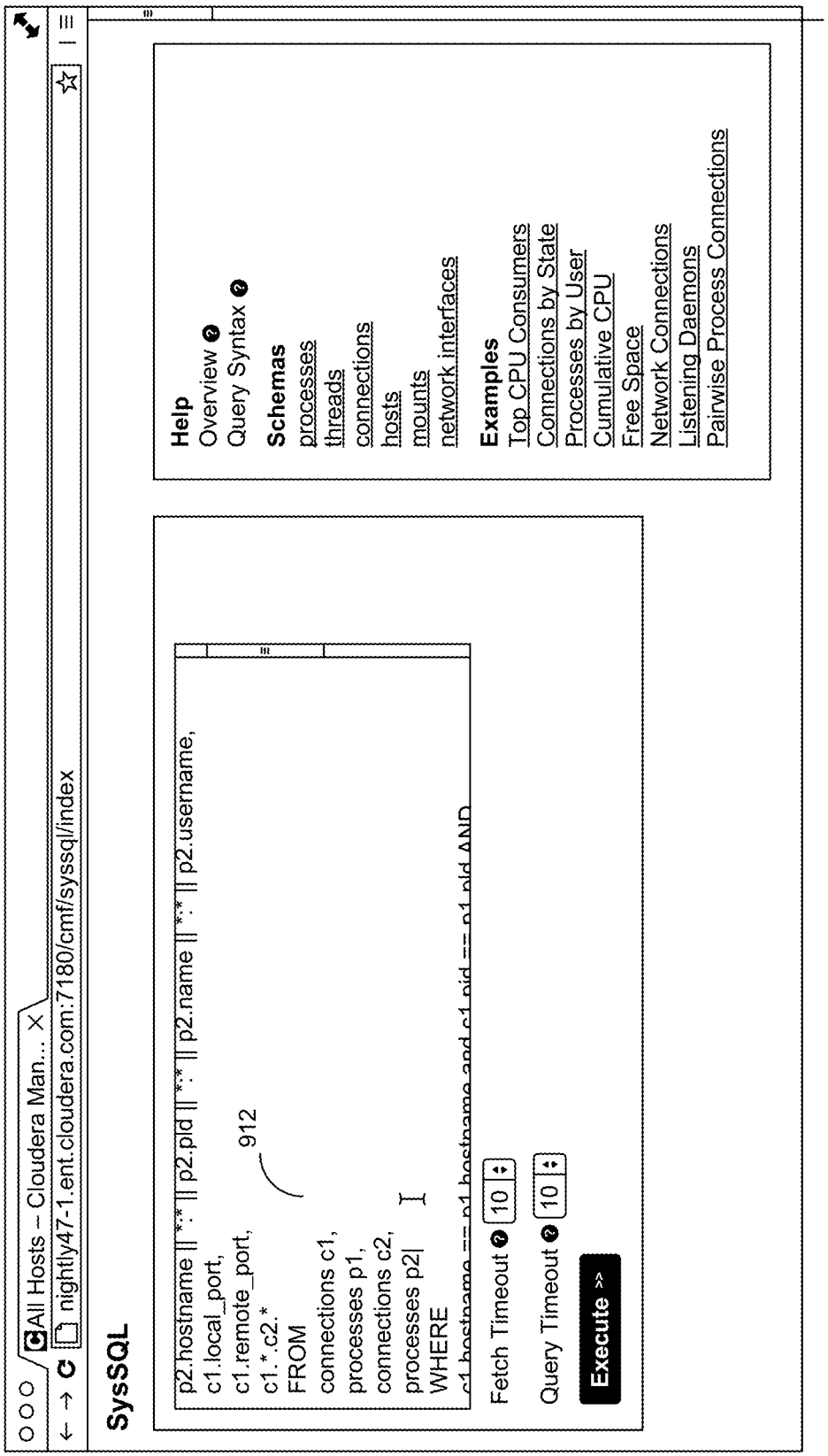
FIG. 9A is a graphical user interface diagram illustrating a graphical user interface for issuing a sixth example sysSQL query on multiple hosts.

The sysSQL query 812, as shown, is for determining which process is using the most CPU. The sysSQL query 812 includes instructions to take a first snapshot of the "processes" table, and after a pre-defined delay, takes a second snapshot of the same table. The sysSQL query 812 also includes instructions to compute the difference between the first and second snapshots to determine processes that use the most CPU. By having that delay between a first trip to fetch data from the underlying hosts and a second trip to fetch data from the underlying hosts, the sysSQL module 120 can compare data at different times to obtain data such as CPU usage over time. When the execute button is selected, the sysSQL module 120 executes the sysSQL query 812 on the data resulting from the computation of the difference between the first and second snapshots (e.g., CPU usage over time). Thus, unlike traditional databases where users query on data that exists, the sysSQL module 120 enables users to query on data that is ephemeral or transient (e.g., created for the purpose of executing the query). The sysSQL module 120 then outputs the results in a results table 820 shown in FIG. 8B. The results table 820 lists the host names, process ids, process names, CPU percentage and RSS (Resident Set Size). From the results table 820, it can be seen that the "python" process, for example, with a process id (pid) of "2865," runs on host "nightly47-1.ent.cloudera.com" and uses the most CPU at 16% and has been allocated 72.23 MiB (mebibytes) of memory. FIG. 9A is a graphical user interface diagram illustrating a graphical user interface for issuing a sixth example sysSQL query on multiple hosts. FIG. 9B is a graphical user interface diagram illustrating a results table displaying results of the query of FIG. 9A.

The sysSQL query 912 includes instructions to determine per process connections and determine remote and local hosts that are paired, join the two sets of data and dedupe them to remove duplicates. The results of the sysSQL query 912 are displayed in the results table 920 of FIG. 9B. As shown, some of the listings on the results table 920 show MySQL connections (e.g., 925A, 925B), while others show the HDFS (930A) talking to HBase (930B) and so on.

Figure 10:
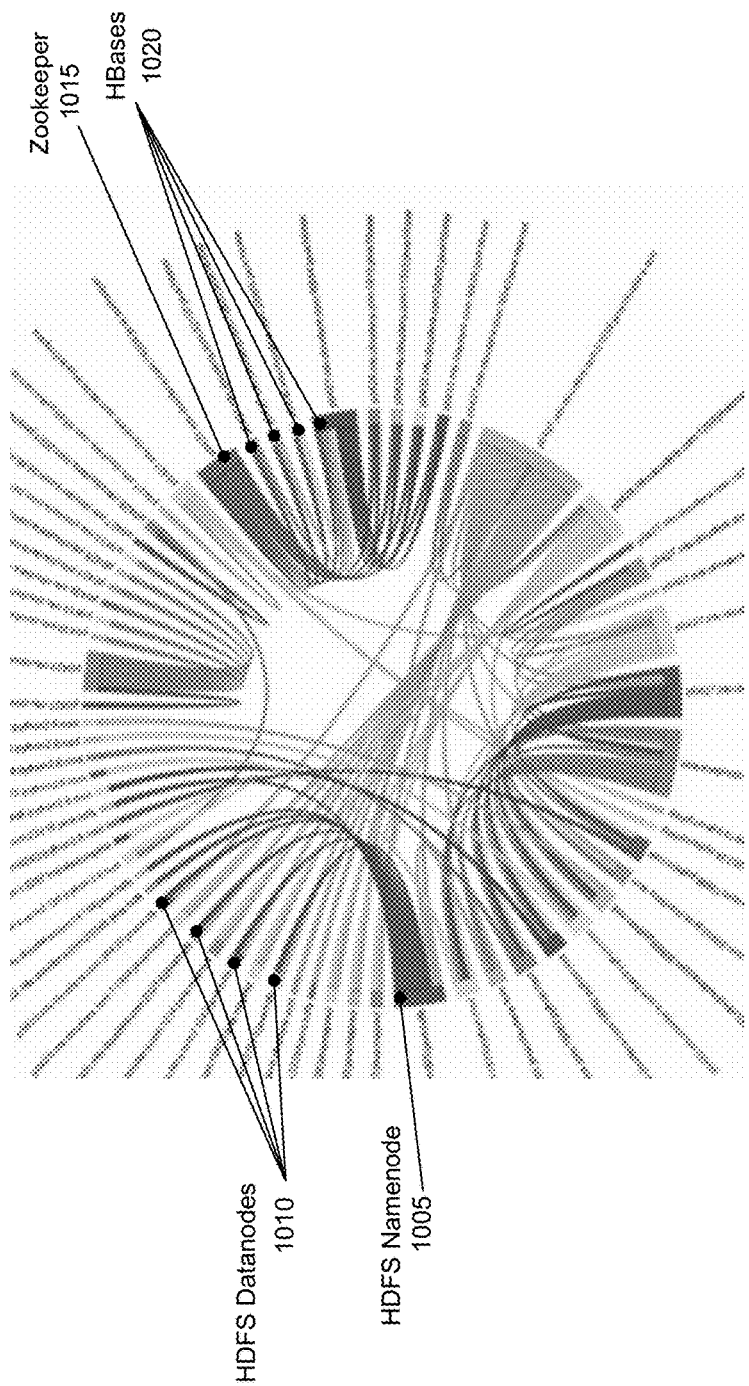
FIG. 10 is a graphical diagram illustrating an example visualization of a cluster using data from the results in response to the sixth example query.

In some embodiments, the web-based interface can include a visualize button or option that can take the results from the query and generate a graphical diagram visualizing the results. FIG. 10 is a graphical diagram illustrating an example visualization of a cluster using results from the execution of the sysSQL query 912. In the diagram, the pairwise network connections are visualized, with the vertices on the diagram being processes. As illustrated, an HDFS node 1005 has a number of connections going to HDFS nodes 1010. In this case, the HDFS node 1005 is the namenode, while the HDFS nodes 1010 are datanodes. Similarly, the Zookeeper 1015 has a number of connections to Hbases 1020. The pattern of the master nodes with many lines open and coordinators are thus clear from the visualization.

Figure 11:
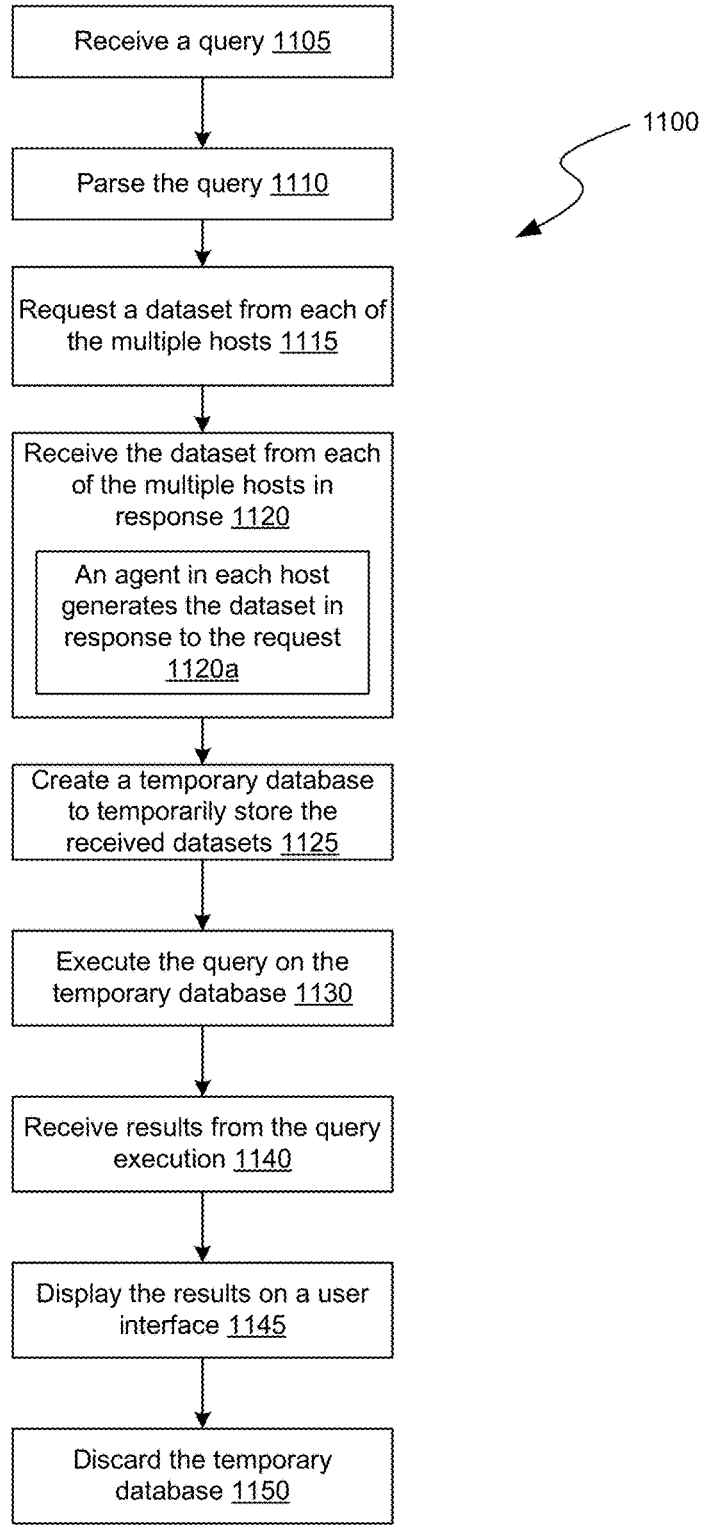
FIG. 11 is a logical flow diagram illustrating an example method of executing an operating system state query issued via a graphical user interface on multiple machines.

FIG. 11 is a logical flow diagram illustrating an example method of executing an operating system state query issued via a graphical user interface on multiple machines.

The example method 1100 includes receiving query (e.g., sysSQL query) submitted by a user via a user interface (e.g., the web-based user interface or admin console, a text-based user interface) by the sysSQL module 120 (e.g., via the user interface module 220) at block 1105. The sysSQL module 120 parses the query 1110. At block 1115, the sysSQL module 120 can identify one or more datasets (e.g., tables) needed for the query and request the one or more datasets from each of the multiple hosts. In some embodiments, the requested dataset can be a processes table, a threads table, a connections table, a hosts table, a mounts table and/or a network interfaces table. At block 1120, the sysSQL module 120 can receive the requested dataset from each of the multiple hosts. An agent in each host generates the dataset in response to the request at block 1120*a*. For example, if a connections table was requested, then a connections table can be returned by an agent of each host. At block 1125, the sysSQL module 120 (e.g., via the query coordinator 210) can create a temporary database to temporarily store the received datasets. The sysSQL module 120 (e.g., via the query execution engine 215) can then execute the received query on the temporary database at block 1130. At block 1140, the sysSQL module 120 can receives results from the execution of the query. In some embodiments, the sysSQL module 120 can display the results on user interface at block 1145. In some embodiments, the sysSQL module 120 can discard the temporary database at block 1150 once the results have been received and/or displayed. In some embodiments, the results can be displayed in a tabular format (e.g., as shown in FIGS. 3B, 5B, 6B, 7B, 8B and 9B). In some embodiments, the sysSQL module 120 can receive instructions to further process the results. For example, the sysSQL module 120 can receive instructions to save, print, email, graph or visualize, etc., the results. In response, the sysSQL module 120 can perform the requested action on the results data.

Figure 12:
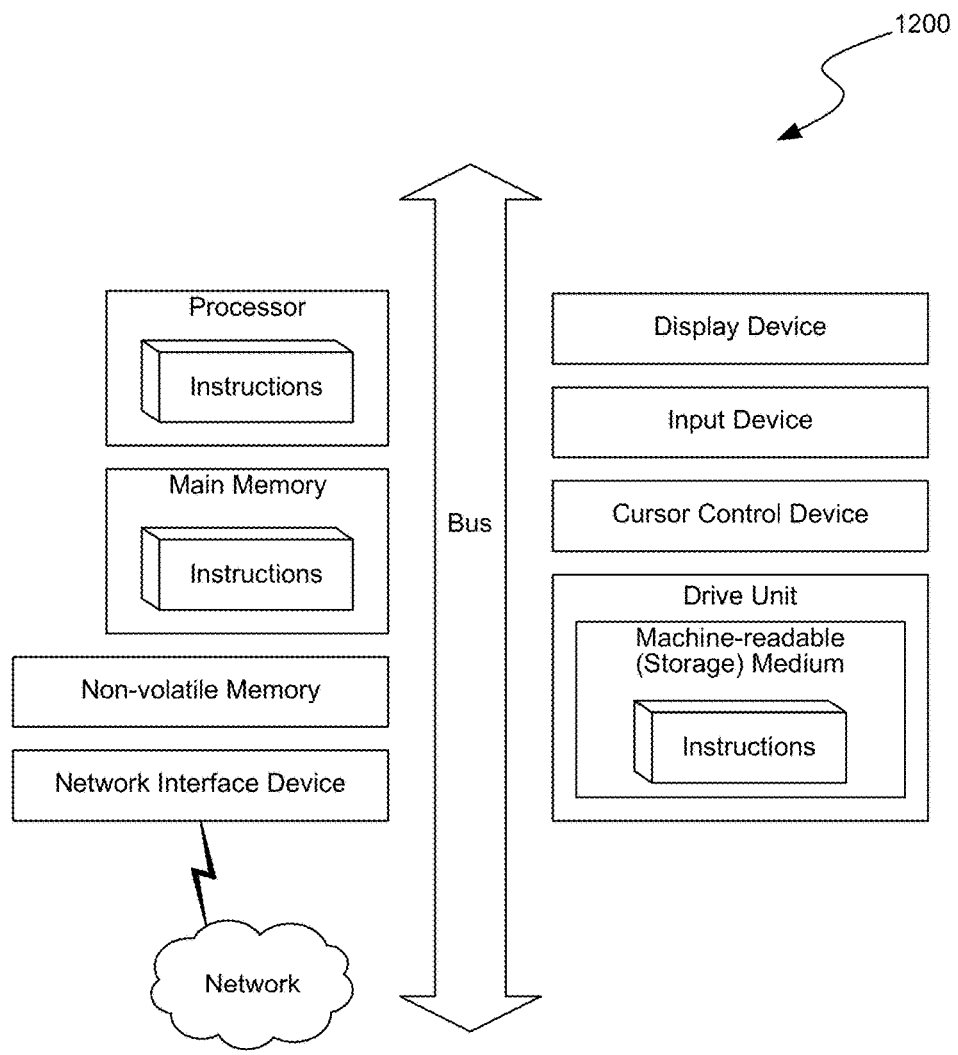
FIG. 12 shows a diagrammatic representation of a machine in the example form of a computer system within which a set of instructions, for causing the machine to perform any one or more of the methodologies discussed herein, may be executed.

FIG. 12 shows a diagrammatic representation of a machine in the example form of a computer system within which a set of instructions, for causing the machine to perform any one or more of the methodologies discussed herein, may be executed.

In the example of FIG. 12, the computer system 1200 includes a processor, main memory, non-volatile memory, and an interface device. Various common components (e.g., cache memory) are omitted for illustrative simplicity. The computer system 1200 is intended to illustrate a hardware device on which any of the components depicted in the example of FIGS. 1 and 2 (and any other components described in this specification, for example, cluster manager server 115, management service 125, database server, client devices from which the web-based user interface (e.g., 305) can be accessed, hosts 135A-N) can be implemented. The computer system 1200 can be of any applicable known or convenient type. The components of the computer system 1200 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs," The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the sysSQL technology have been described herein for purposes of illustration, but that various modifications may be made without deviating from the spirit and scope of the embodiments. Accordingly, the embodiments are not limited except as by the appended claims.

What is claim is:

1. A method of querying operating system states of multiple hosts in a cluster, comprising
receiving a Structure Query Language (SQL) query to determine the operating system states of the multiple hosts in the cluster;
aggregating, from each of the multiple hosts, operating system state information in response to receiving the SQL query;
wherein aggregating includes, for each of the multiple hosts:
identifying a dataset applicable to the SQL query by parsing the SQL query;
requesting the identified dataset; and
receiving the dataset including the operating system state information in response to the request;
creating a temporary database for storing the operating system state information by converting the datasets received from the multiple hosts into a queriable form; and
executing the SQL query on the temporary database to obtain as results the operating system states of the multiple hosts.

2. The method of claim 1, wherein the SQL query is received from a user via one of a graphical user interface, a graphical web-based user interface or a text-based user interface accessible to an administrator of the cluster.

3. The method of claim 1, further comprising displaying the results in a table on a web-based user interface, wherein the operating system state information includes a table including data fields defined by a schema.

4. The method of claim 1, wherein
the datasets received from each of the multiple hosts are tables.

5. The method of claim 4, wherein each of the multiple hosts creates the table using system information in a /proc file system according to a table schema.

6. A method, comprising:
receiving a system Structure Query Language (sysSQL) query directed to multiple machines in a cluster;
wherein the sysSQL query is submitted by a user using a user interface; and
wherein the sysSQL query is a request for system information associated with the multiple machines; and
creating a database, in response to receiving the sysSQL query, by aggregating system information from some or all of the multiple machines, wherein aggregating includes, for some or all of the multiple machines:
identifying a dataset applicable to the sysSQL query by parsing the sysSQL query;
requesting the identified dataset;
receiving the dataset including the system information in response to the request; and
converting the received dataset into a queriable form; and
executing the sysSQL query on the database to obtain as results system information associated with some or all of the multiple machines.

7. The method of claim 6, further comprising:
discarding the database after obtaining the results.

8. The method of claim 7,
wherein the datasets received from some or all of the multiple machines are tables.

9. The method of claim 6, wherein each of the multiple machines uses an application programming interface (API) call to obtain an initial dataset and formats the initial dataset to provide the dataset identified based on the sysSQL query.

10. The method of claim 6, wherein the system information is associated with at least one of: processes, threads, connections, hosts, mounts or network interfaces.

11. The method of claim 6, further comprising displaying the results in a table on the graphical user interface that is web-based.

12. The method of claim 6, wherein the user interface is one of: a text-based user interface or a graphical user interface.

13. The method of claim 6, further comprising:
detecting that a request to at least one of the multiple machines to provide a dataset identified based on the sysSQL query has timed out;
wherein the database is created without system information from the at least one of the multiple machines.

14. A system comprising:
a server; and
multiple hosts in a cluster;
the server being configured to:
receive a Structure Query Language (SQL) query requesting operating system state information associated with the multiple hosts in the cluster, the SQL query being submitted via a user interface;
aggregate, from each of the multiple hosts, operating system state information in response to receiving the SQL query, wherein aggregating includes:
identifying datasets applicable to the SQL query by parsing the SQL query;
requesting the identified datasets from agents of the multiple hosts; and
receiving the requested datasets including the operating state information in response to the requests;
create a temporary database by converting the received datasets into a queriable form; and
execute the SQL query on the temporary database to obtain the operating system state information associated with the multiple hosts in the cluster.

15. The system of claim 14, wherein the server is further configured to generate a graphical diagram to visualize the operating system state information associated with the multiple hosts.

16. The system of claim 14, wherein the server is further configured to display the operating system state information in a tabular format on the user interface.

17. The system of claim 14, wherein the server is configured to identify at least one dataset needed for the query and request the at least one dataset from each of the multiple hosts.

18. The system of claim 17, wherein each host is configured to query a virtual file system to obtain runtime system information and format the runtime system information using a schema to obtain the at least one dataset.

19. The system of claim 17, wherein the at least one dataset includes processes, threads, connections, hosts, mounts or network interfaces dataset.

20. The system of claim 14, wherein the user interface is one of a text-based user interface or a graphical user interface.

* * * * *